Aug. 30, 1955     H. A. MACKIE ET AL     2,716,252
WINDSHIELD WIPERS
Filed Aug. 23, 1949     2 Sheets-Sheet 1
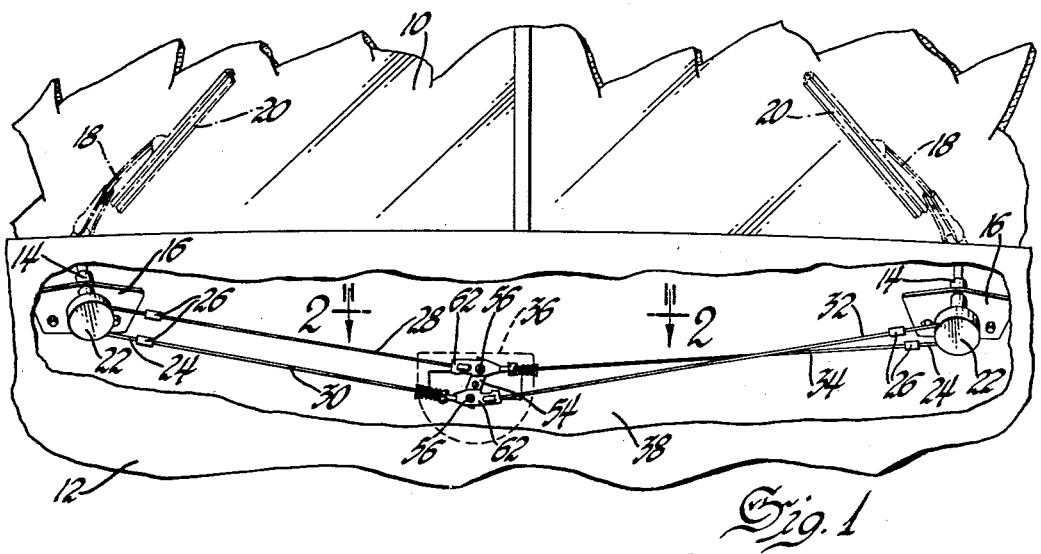
Inventors
Harry O. Mackie &
Louis P. Garvey
By Willits, Helwig & Baillio
Attorneys

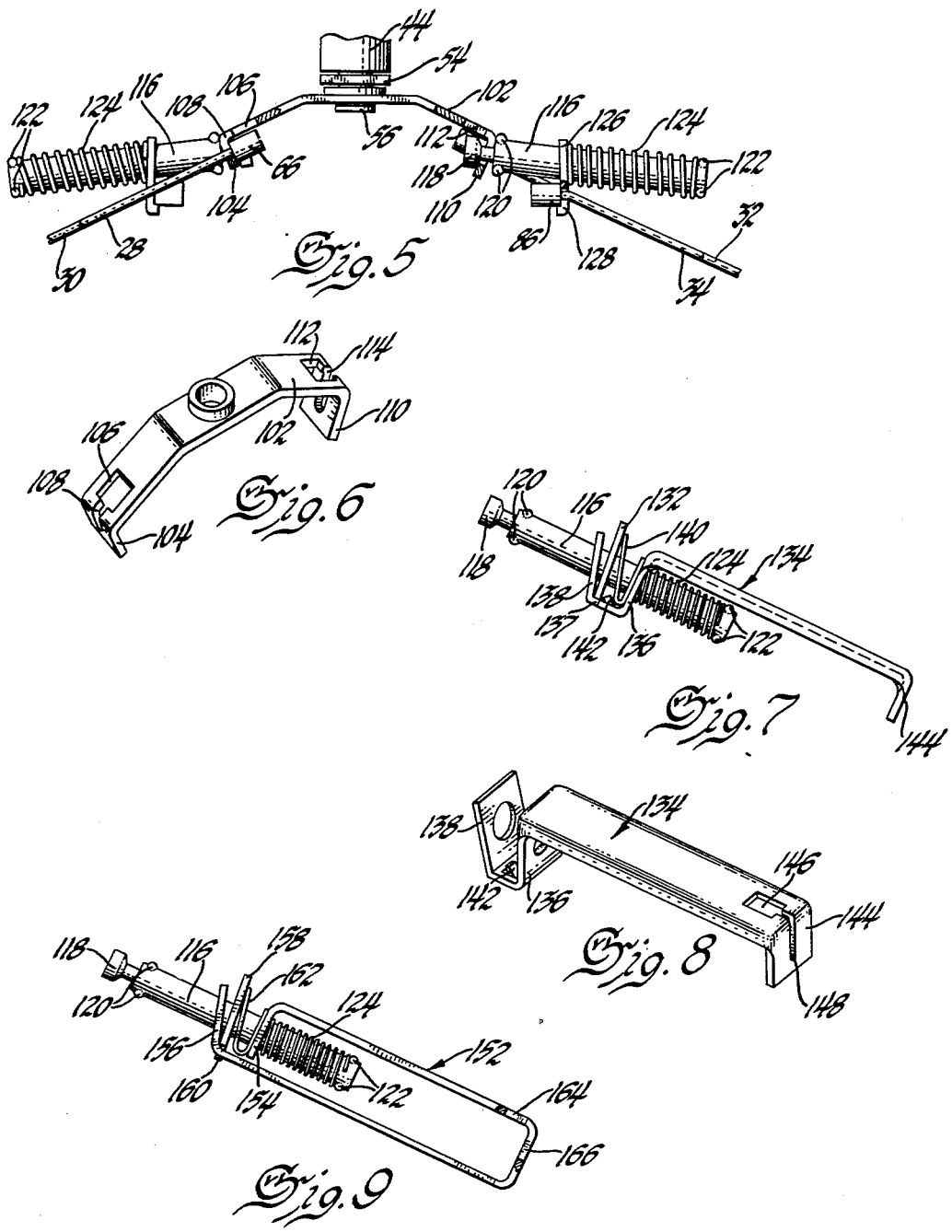

United States Patent Office 2,716,252
Patented Aug. 30, 1955

2,716,252

WINDSHIELD WIPERS

Harry A. Mackie, Birmingham, and Louis P. Garvey, Detroit, Mich., assignors to General Motors Corporation, Detroit, Mich., a corporation of Delaware Application August 23, 1949, Serial No. 111,778

16 Claims. (Cl. 15—253)

This invention relates to windshield wipers and more particularly to a windshield wiper drive mechanism having an automatic cable tensioning device.

Windshield wipers are normally mounted on shafts below the windshield and are connected by suitable drive mechanisms to a motor mounted on the fire wall substantially at the center of the car. In this drive mechanism pulleys are located on the ends of the windshield wiper shafts and a short length of flexible wire cable extends over the pulley and beyond the pulley a length sufficient to provide for the necessary movement without the end of the cable contacting the pulley. The ends of the cable are attached to short lengths of piano wire which are connected to a cable tensioning device for slack adjustment. The slack adjuster is pivotally mounted on an arm fixed to the windshield wiper motor shaft. The slack adjuster has at one side of its connection to the arm, a fastening device to secure one of the wire cables and at the other side an extended guide with an abutment at the end. A washer type detent is slidably fitted about the guide and a compression spring surrounding the guide engages the abutment at one end and the detent at the other end to continually urge the detent toward the inner end of the guide and thus maintain a uniform tension in the wire cable, which is attached to the detent.

The object of this invention is to provide in a windshield wiper drive mechanism an automatic adjusting device which is capable of maintaining a uniform tension on the cable when the cable elongates or stretches during the operation of the windshield wipers.

Another object of the invention is to provide a simplified cable tensioning device for windshield wiper drive mechanisms which may be stamped from sheet metal.

Another object of the invention is to provide in a windshield wiper drive mechanism, a slack adjuster wherein the spring acts to take up the slack in the cable when there is no strain on the cable and a detent mechanism acts to relieve the spring of load when the cable is under strain.

These and other objects of the invention will be more apparent from the following description and drawings showing several preferred embodiments illustrative of the invention.

In the drawings, Figure 1 shows a fragmentary view of the inside of the windshield and of the dash panel with parts broken away to show the windshield wiper drive.

Figure 2 is an enlarged fragmentary sectional view on line 2—2 of Figure 1 showing the windshield wiper motor and cable tensioner.

Figure 3 is a section of Figure 2 on line 3—3.

Figure 4 is a perspective view of the cable tensioner element.

Figure 5 is an elevation view with parts in section of a modified cable tensioner.

Figure 6 is a perspective view of a portion of the modified cable tensioner.

Figure 7 is an elevation view of another modified cable tensioner.

Figure 8 is a perspective view of the guide of the cable tensioner in Figure 7.

Figure 9 shows another modified cable tensioner.

The invention is illustrated on a vehicle having a two-part windshield 10 positioned above a dash panel 12, which is broken away so that the windshield wiper drive mechanism may be seen. On each side of the windshield a shaft 14 is mounted in the bearing support 16 which is secured to the vehicle body. The shaft 14 extends outside of the body and has an arm 18 secured to the end thereof. The arm 18 supports a windshield wiper element 20 in the conventional way. The pulley 22 is mounted on the inner end of the windshield wiper shaft 14. A woven wire cable 24 passes over the pulley and preferably makes a turn and a half to insure sufficient frictional contact or to engage fastening means for a positive drive between the cable and pulley. The cable 24 extends from the pulley a sufficient distance to allow for the necessary movement to oscillate the windshield wipers without the ends of the cable contacting the pulley.

A pair of deformable fastening sleeves 26 are secured to the ends of the cable 24. The deformable fasteners 26 are each connected to a short length of piano wire. Since this portion of the cable is not required to bend the piano wire may be substituted for the more flexible but more expensive woven wire cable. The left windshield wiper has wire cables 28 and 30 extending to the motor in substantially parallel relation. The right windshield wiper has crossed wire cables 32 and 34 extending toward the motor. The cables for one wiper must be crossed so that the windshield wipers move assymmetrically.

The windshield wiper motor 36 is mounted on the other side of the fire wall 38 by means of a bracket 40 which is secured to the fire wall. The bracket 40 has a central aperture located in alignment with the motor shaft 42 with a cylindrical bearing support 44 secured within the aperture and a bearing 46 positioned in the support. The motor shaft 42 has at its end a block 48 forming one part of a universal connection. A U-shaped plate 50 fits over the block 48 with the inside edges of the U-shaped plate engaging the edges of the block 48 to provide a simple universal type drive. The U-shaped member 50 is secured by suitable means, such as rivetting, to the stub shaft 52 which extends through the bearing 46 and is drivingly connected at its other end to an arm or crank 54. The arm 54 has a pin 56 secured at each end thereof with a bushing 58 secured thereon by a fastener 60. The bushing 58 and the bearing 46 are preferably made of porous metal and impregnated with oil so that they are self-lubricating.

The tensioning mechanism is connected to the arm 54 by a rod or arm 62 having a central aperture with a bearing flange 64 surrounding the aperture and engaging the bushing 58 on the pin 56 for pivotal support. An arm 62 is positioned on each of the pins 56 which are located on opposite sides of the axis of rotation in opposed relation. The upper arm has a fastening means for the wire cable on the left side. As shown in Figure 2, the cable 28 has a small cylindrical abutment 66 secured to the end thereof. The fastener portion of the arm 62 has an aperture 68 to receive the abutment 66 and at the inside edge of the aperture is concavely deformed at 70 to seat the abutment on one side and convexly deformed at 72 at the other side of the aperture to engage the edge of the abutment 66 and guide the cable wire 28.

The cable tensioning mechanism is located on the other end of the arm 62. This portion 74 of the arm is stamped or deformed into a uniform channel or U-shaped section. At the end a portion of the edge of the U-shaped part 74 is slit and deformed outwardly to provide winglike abutments 76. A spring 78 engages the abutments at one end and surrounds the U-shaped part 74, and engages a detent 80 at the other end. The detent 80 has a generally rectangular shape as shown in Figure 4 with an aperture 82 fitting around the U-shaped part 74 of the rod. The detent 80 has a slot 84 and bent ends to provide a fastening means for the cable 34 which passes through the slot 84 and has an abutment 86 engaging the face of the detent on the other side of the spring 78.

The windshield wiper motor 36 is of the oscillating type which drives the arm 54 with an oscillating motion. The upper rod 62 has a fastening aperture 68 on the left side to connect the rod to the wire cable 28. The other side of the rod 62 has the cable tensioning detent 80 which is attached to the wire cable 34. The lower rod 62 is reversely positioned with the fastening aperture 68 on the right side and connected to the wire cable 32. The other or left side of the lower rod 62 has a cable tensioning detent 80 secured to the wire cable 30. The wire cables 28 and 30 extend in parallel relation and are connected to the ends of the cable 24 extending around the pulley 22 of the left windshield wiper. The wire cables 32 and 34 are crossed and also are connected to the ends of cable 24 which extend around the right windshield wiper pulley 22. When the motor is operating to drive the windshield wipers the slack will be taken up in the wire rod 30 when it is slack and the wire cable 28 is under tension the spring 78 will push against the detent 80 and pull the slack cable 30 taut. When the motion of the motor and arm 54 reverses the wire cable 30 will become taut and tilt the detent 80 which will pivot the free end in the legs of the U-shaped section 74 and bite into the curved outside surface of this section to grip this member. Thus the tension force in the wire cable 30 will not act to compress the spring 78. The wire cables 32 and 34 of the other side are similarly connected in an opposite manner to the fastening aperture 68 and cable tensioning detent 80. The cable tensioning device will make adjustments when the cable is loose and not under stress to maintain a constant tension in the cables.

This cable tensioning device is capable of various modifications. In one modification shown in Figure 5 the arm 54 has similar pivot pins 56 at each end. A modified arm 102 is pivotally mounted on each of the pins 56. At the end of the arm 102 attached to the upper pin 56 a short flange 104 is bent at right angles to the adjacent portions of the arm. An aperture 106 is positioned in the flat portion of the arm 102 adjacent the flange 104, which is large enough to pass the abutment 66 on the end of the wire cable 28. A slot 108 as wide as the wire 28 but smaller than the abutment 66 extends from the aperture 106 substantially to the center of the flange 104.

The other side of the rod 102 has a similar flange 110 with an aperture 112 in the flat portion of the rod adjacent the flange 110. A similar narrow slot 114 extends from the aperture 112 substantially to the center of the flange 110. This aperture in the slot provides fastening means for the slack adjuster stem 116 which has a uniform cross section and an integral fastening head 118 connected by a smaller stem portion at one end which fits in the slot. The slack adjuster stem 116 has projections 120 at the head end to provide an abutment for a detent and projections 122 at the other end to provide an abutment for one end of a coil spring 124. The spring 124 engages at the other end a detent 126 which has a round aperture conforming to the section of stem 116. The cable 34 extends through a slot 128 in the detent 126 and the abutment 86 on the end of the cable 34 engages detent 126. The lower arm 102 is exactly the same but has the stem and wire attached to the opposite ends. Thus the lower stem 116 is attached to flange 104 and lower wire 32 is attached to flange 110 of the lower arm 62.

Figure 7 shows a slightly modified form of slack adjuster using a similar slack adjuster stem 116, and a detent 132 which is mounted in a guide member 134. The guide member 134 has a generally elongated portion extending parallel to the stem 116 with a deep downwardly extending flange 136 and a short connecting portion 137 and an upwardly extending flange 138 at one end. Both of these flanges are suitably apertured for the stem 116. The detent 132 is positioned between the flanges and resiliently urged toward flange 138 by a U-shaped spring 140 with recesses in the ends of the legs for the stem 116 which seats against the flange 136 and detent 132. Between the bases of flanges 136 and 138 from the connection portion 137 a tongue 142 is bent upwardly to hold the base of detent 132 adjacent the tongue 138. The stem 116 has abutments 120 at the head to prevent the guide sliding off the stem. The abutment 122 holds one end of spring 124 while the other end engages one face of the flange 136. The other end of the guide 134 has a fastener flange 144 with the aperture 146 and slot 148 to provide an anchorage for wire cable 34.

The cable tensioning device shown in Figure 9 employs the same stem 116 which is shown in Figures 5 and 7 but has a modified guide member 152 consisting of a generally U-shaped sheet metal stamping. One leg of the U-shaped guide 152 has a flange 154 bent at right angles to the stem and having an aperture for the stem 116. The other leg extends beyond the flange 154 and has an inwardly bent flange 156 provided with an aperture aligned with the aperture in flange 154 for the stem 116. A generally rectangular shaped detent 158 having a central aperture for the stem 116 is positioned between the flanges 156 and 154. The detent 158 has a tongue 160 extending into an aperture in the end of the leg of the U-shaped guide member 152 adjacent the base of flange 156. A U-shaped spring 162 recessed to slip over the stem 116 resiliently urges detent 158 toward the flange 156 and seats against flange 154. A spring 124 surrounds the stem 116 and engages abutment 122 at one end and at the other end engages the inside face of flange 154. Fastening means for use with a wire or cable having a stop at the end such as cable 34 and stop 86 is provided at the base of U-shaped guide 152 by a large aperture 164 in one of the legs and a connecting slot 166 extending around the corner into the base of the U-shaped guide.

Each of these modifications function in substantially the same manner as the original showing in Figure 2. When the cable 34 is slack the spring 78 or 124 will move the detent 80 or 126 toward the head end of the stem 116 while when the cable is under heavy tension the detent will tilt to grip the stem. The stem 116 is also universally connected to the arm 102 by the head 118, in order to provide freedom of movement which will allow for extensive misalignment between the arm 102 and the wire cable 34.

The modifications shown in Figures 7 and 9 show two forms in which guide means are provided for the detent. In this form of invention the spring 124 acts directly against the guide member 134 or 152 and an additional spring is employed to operate the detent which is pivotally mounted on the guide means. This form of invention works substantially the same as the other forms. When the cable is slack the spring 124 will act against the guide means and tend to push it toward the head end of the stem 116. This pressure will tend to straighten the detent so that it will slide along the stem, thus the device will take up the slack in the cable. When the cable is taut and pulls on the guide 152 the detent 158 is urged to the tilting position by the spring to grip the stem 116 so that the stress in the cable is not normally supported by the spring.

The basic features of the invention have been illustrated by the above described specific embodiments. It will be apparent that many modifications of the invention may be made within the scope of the appended claims.

We claim:

1. In a windshield wiper mechanism, power means, a crank connected to said power means, a rod secured on one side of the axis of said crank having a U-shaped cross section and an abutment at the end, fastening means secured to said crank on the other side of the axis of said crank, driving means connected to a windshield wiper blade, a movable detent on said rod, connecting means between said detent and said driving means, a second connecting means between said fastening means and said driving means, resilient means on said rod engaging said abutment and urging said detent in a direction to tighten said connecting means.

2. In a windshield wiper mechanism, a motor, a shaft having an arm driven by said motor, a pair of cable tensioner rods pivotally secured to said arm and extending in opposite directions, a detent slidably mounted on each of said rods, a spring secured to the end of each of said rods and urging said detents away from said ends, a pair of pulleys mounted on shafts, windshield wipers mounted on said shafts, a cable connected to a detent on one of said rods and passing over one of said pulleys and secured to the other rod, a second cable connected to a detent on the other rod and passing over the other pulley and secured to the one rod.

3. In a windshield wiper mechanism, a motor, a shaft having an arm driven by said motor, a pair of cable tensioner rods having a U-shaped cross section pivotally secured to said arm and extending in opposite directions, a detent having an aperture fitting around said rod on each of said rods, a spring secured to the end of said rods and urging said detents away from said ends, a pair of shafts having driving means, windshield wipers mounted on said shafts, means connected to a detent on one of said rods and connected to one of said driving means and secured to the other rod, a second means connected to a detent on the other rod and connected to the other driving means and secured to the one rod.

4. In a windshield wiper mechanism, a motor, a shaft having an arm driven by said motor, a pair of cable tensioner rods pivotally secured to said arm and extending in opposite directions, a detent slidably mounted on each of said rods, a spring secured to the end of each of said rods and urging said detents away from said ends, a pair of shafts having driving means, windshield wipers mounted on said shafts, a member connected to a detent on one of said rods and connected to one of said driving means and secured to the other rod, a second member connected to a detent on the other rod connected to the other of said driving means and secured to the said one rod.

5. In a windshield wiper mechanism, power means, a crank connected to said power means, a rod having a U-shaped cross section and an abutment at one end secured to said crank on one side of the axis of said crank, driving means connected to a windshield wiper blade, a detent slidably mounted on said rod, first connecting means between said detent and said driving means, a second connecting means between the other side of said crank and said driving means, and resilient means on said rod engaging said abutment and urging said detent in a direction to tighten said connecting means.

6. In a windshield wiper mechanism, power means, a crank connected to said power means, a rod, pivot connection means between one end of said rod and said crank on one side of the axis of the crank, an abutment on said rod adjacent the other end of said rod, detent means axially slidably mounted on said rod between said pivot connection and said abutment including a single member swingable from one to another position about a pivot point coaxially moving along said rod, said single member having a portion disengaging from said rod to permit free movement in one direction toward said pivot when said single member is in said one position and engaging said rod to prevent movement in the other direction toward said abutment when said single member is in said another position, resilient means engaging said abutment and engaging and urging said detent means to said one position and in said one direction, a windshield wiper having driving means, a first connecting means connected between said detent means and said driving means, a second connecting means connected between said crank on the other side of the axis and said driving means, said resilient means urging said detent means in said one direction to release said detent means and to move said detent means toward said pivot connection to take up slack in said first and second connecting means and said first connecting means being connected to said detent means to urge said detent means in the other direction to prevent movement on said rod.

7. In a windshield wiper mechanism, power means, a crank connected to said power means, a rod, a pivot connection between one end of said rod and said crank on one side of the axis of the crank, an abutment on said rod adjacent the other end of said rod, detent means slidably mounted on said rod between said pivot connection and said abutment, said detent means cooperating with said rod to permit free movement in one direction toward said pivot when said detent means is in one position and to prevent movement in the other direction toward said abutment when said detent means is in another position, resilient means engaging said abutment and engaging and urging said detent means to said one position and in said one direction, a windshield wiper having driving means, a first connecting means connected between said detent means and said driving means, a second connecting means connected between said crank on the other side of the axis and said driving means, said resilient means urging said detent means in said one direction to release said detent means and to move said detent means toward said pivot connection to take up slack in said first and second connecting means and said first connecting means being connected to said detent means to urge said detent means in the other direction to prevent movement on said rod.

8. In a windshield wiper mechanism, power means, a crank connected to said power means, a rod, a pivot connection between one end of said rod and said crank on one side of the axis of the crank, an abutment on said rod adjacent the other end of said rod, a single detent member slidably mounted on said rod between said pivot connection and said abutment, said single detent member having portions engaging said rod to permit free movement axially of said rod in one direction toward said pivot when said detent member is in one position and to prevent movement in the other direction toward said abutment when said detent member is in another position, a single resilient member engaging said abutment and directly engaging and urging said detent member to said one position and in said one direction, a windshield wiper having driving means, a first connecting means connected between said detent member and said driving means, a second connecting means connected between said crank on the other side of the axis and said driving means, said single resilient member urging said detent member in said one direction to release said detent member and to move said detent member toward said pivot connection to take up slack in said first and second connecting means and said first connecting means being connected to said detent member to urge said detent member in the other direction to prevent movement on said rod.

9. In the windshield wiper mechanism as defined in claim 6, said detent means also including a guide having a channel-shaped portion with apertures in the sides of said channel-shaped portion, said rod extending through said apertures across said channel-shaped portion, said single member being located between the sides of said channel-shaped portion, said first connecting means connected between said guide portion of said detent means and said driving means, and said resilient means urging said single member in said one direction to release said detent means and urging said guide toward said pivot connection to take up slack in said first and second connecting means.

10. In the windshield wiper mechanism as defined in claim 6, said detent means also including a guide having two spaced transverse portions with an aperture in each portion, said rod extending through said apertures in said transverse portions, said single member being located between said transverse portions, said first connecting means connected between said guide portion of said detent means and said driving means, and said resilient means urging said single member in said one direction to release said detent means and urging said guide toward said pivot connection to take up slack in said first and second connecting means.

11. In the windshield wiper mechanism as defined in claim 6, said detent means also including a guide having a portion having an aperture, said rod extending through the aperture in said portion, said single member being located adjacent said portion having an aperture, said first connecting means connected between said guide portion of said detent means and said driving means, and said resilient means urging said single member in said one direction to release said detent means and urging said guide toward said pivot connection to take up slack in said first and second connecting means.

12. In the windshield wiper mechanism as defined in claim 6, said detent means also including a guide having a channel-shaped portion with apertures in the sides of said channel-shaped portion, said rod extending through said apertures across said channel-shaped portion, said single member being located between the sides of said channel-shaped portion, said first connecting means connected between said guide portion of said detent means and said driving means, said resilient means including one spring engaging said single member and said guide to urge said single member in said one direction to release said detent means and a second spring engaging said rod and said guide to urge said guide toward said pivot connection to take up slack in said first and second connecting means.

13. In the windshield wiper mechanism as defined in claim 6, said detent means also including a guide having a channel-shaped portion with apertures in the sides of said channel-shaped portion and an attaching portion extending from one end of the channel-shaped portion, said rod extending through said apertures across said channel-shaped portion, said attaching portion extending parallel to said rod, said single member being located between the sides of said channel-shaped portion, said first connecting means connected between said attaching portion of said detent means and said driving means, and said resilient means urging said single member in said one direction to release said detent means and urging said guide toward said pivot connection to take up slack in said first and second connecting means.

14. In a windshield wiper mechanism as defined in claim 6, said detent means also including a guide having a U-shaped portion having opposed parts with free ends, each of the free ends of said guide having a flange extending across between said opposed parts, said flanges being spaced, each flange having an aligned aperture, said rod extending through said apertures and extending between the opposed parts of said guide, said first connecting means being connected between said U-shaped portion of said detent means and said driving means, said single member being located between said flanges, and said resilient means urging said single member in said one direction to release said detent means and urging said guide toward said pivot connection to take up slack in said first and second connecting means.

15. In a windshield wiper mechanism as defined in claim 6, said pivot connection means including a link having a flange at one end, an aperture in said pivot connection means adjacent said flange, a slot extending from the aperture in said pivot connection means and to the center of said flange, and said rod having a securing head secured in said slot.

16. In a windshield wiper mechanism as defined in claim 6, a flange at the end of said pivot connection means, an aperture in said securing means adjacent said flange, a slot extending from the aperture in said securing means and to the center of the flange, and said rod having a securing head secured in said slot.

References Cited in the file of this patent

UNITED STATES PATENTS

| 716,442 | Lawler | Dec. 23, 1902 |
| 1,491,834 | Van Loozen | Apr. 29, 1924 |
| 2,363,229 | Cade | Nov. 21, 1944 |

FOREIGN PATENTS

| 422,217 | Great Britain | Jan. 8, 1935 |
| 622,488 | Great Britain | May 3, 1949 |